(12) United States Patent
Gomez Portela

(10) Patent No.: US 6,576,347 B1
(45) Date of Patent: Jun. 10, 2003

(54) SAW WIRE

(76) Inventor: Julio Gomez Portela, Calle Nou de Sant Francesc, 17, E-08002, Barcelona (ES)

( * ) Notice: Subject to any disclaimer, the term of this patent is extended or adjusted under 35 U.S.C. 154(b) by 0 days.

(21) Appl. No.: 09/646,227

(22) PCT Filed: Mar. 17, 1999

(86) PCT No.: PCT/ES99/00064

§ 371 (c)(1),
(2), (4) Date: Sep. 13, 2000

(87) PCT Pub. No.: WO99/37431

PCT Pub. Date: Jul. 29, 1999

(51) Int. Cl.⁷ .............................. B32B 9/02; B32B 9/04
(52) U.S. Cl. ................. 428/478.2; 428/478.4; 428/478.8
(58) Field of Search ................. 428/478.2, 478.4, 428/478.8

(56) References Cited

FOREIGN PATENT DOCUMENTS

| DE | 208212 | | 2/1908 |
| DE | 357720 | | 2/1921 |
| GB | 262827 | | 3/1928 |
| GB | 323 724 | * | 1/1930 |

* cited by examiner

Primary Examiner—Leszek Kiliman
(74) Attorney, Agent, or Firm—David Garrison; Garrison & Assoc. PS

(57) ABSTRACT

Utilization of gelatine in the form of sheets as support for images and the transfer thereof to surfaces or to tridimensional bodies through humidification of the sheet and, in certain cases, further subjecting said sheet to heat at a temperature comprised between 35° and 45° approximately. The surface on which the image contained in the gelatine sheet is applied can be a die-cut laminar material, with the possibility of separating each individual element from said die-cut material so that each individual element contains the corresponding image portion.

14 Claims, No Drawings

SAW WIRE

This invention relates to the use of gelatin in sheets as image support and to a method for the transfer thereof to 3-D surfaces or bodies.

BACKGROUND OF THE INVENTION

Gelatin is a protein derived from animal skin, fibrous white connective tissue and bones. This protein is fully composed of amino acids in polypeptide linkages and is derived by boiling bones, tendons, ligaments etc. in water. Gelatin is now obtained with industrial processes which guarantee its necessarily safe production. Basically, obtaining gelatin with industrial processes consists in extracting collagen from ox or pig skins which have been previously submitted to a thorough washing, purifying and drying process.

The uses of gelatin are known in food sector being present in that case as dry gelatin. Examples of use of dry gelatin are for preparing desserts, meat products (canned ham, meat slices, cooked meat, etc.), pastry products, soups, ice-creams, etc. In this case, gelatin must be used unmixed, when it is transparent, tasteless and odourless.

Another use currently known of gelatin is in the field of photography. The fact that gelatin is a medium significantly effective as protecting colloid for silver chloride dispersed therein prevents silver salt to be separated. In addition, gelatin shows a great easiness to be insolubilized with titanium which makes it a basic element for preparing silver salt sensitive films and photographic paper. In addition to regulating silver halide grain, gelatin has the property to indirectly controlling the photographic properties because of the presence of impurity in the different types of gelatin which act as restringent, sensitizer or desensitizer. For preparing plates and films, gelatin must have a great elasticity, a low content of ashes and a 5–6 pH with a 10% moisture content.

In addition, gelatin is also used in the pharmaceutical field, for example for producing capsules, either soft or hard, as binding agent for producing tablets and sugar-coated pills, for producing suppositories, pills and preparing emulsions. Gelatin is capable to protect drugs against air and light influence. The use of gelatin is also known as a substitute for blood plasma and as haemostatic sponges because they show a perfect compatibility with human tissues. In this case, a special kind of gelatin is used which has to be pyrogen-free.

In the chemical industry, gelatins are used which require a colloid protector for particle size control processes, namely to prevent separating steps or to assist in clarification processes.

The state of the art includes other uses of gelatin such as the production of adhesives, cements, plastics, artificial silk, moulds and applications in the field of bacteriology to prepare culture broth. In addition, gelatin is also widely used in paper and textile industries.

GB 323 724 (Steele) relates to transfers for decorative purposes comprising a paper backing, a first layer of soluble gelatin and a second layer of permanent gelatin. In use, an image is printed onto the layer of permanent gelatin which is then adhered to the surface of an article, such as a glass table top or a window. The application of heat and/or moister dissolves the layer of soluble gelatin and permits the paper backing to be removed.

The present invention differ from the teaching of said prior art in that there is no paper backing during image transfer, i.e. the gelatin sheet is self supporting.

FR 2640473 (Phoughon) relates to the food industry and to a product for decorating savoury or sweet culinary preparations, said product having the form of a film of an edible substance including decorations which are themselves edible. The film advantageously consists of at least one of the materials from the group of materials comprising communion wafers, almond paste, chocolate and gelatine. In the case of the film being of gelatine this is not at all self/supporting as in the present invention but two auxiliary protective and supporting films are used. Moreover the group of cited materials does not share the property of being elastic, as is essential to the gelatine used as in this invention but only edible.

JP-53135717 (SUMITOMO BAKELITE CO.)discloses the application of a water-soluble edible printed film such as a gelatin/starch system to food, dissolving film to leave image and cooling. The film are placed dried onto the surface of edible matter of high water content in heat fused state, dissolving the film alone by water and heat. Therefore said films are not at all elastic in the moment to be placed onto the product on which they have to leave an image.

DESCRIPTION OF THE INVENTION

The object of this invention is to use gelatin in sheets as support for images of any kind and the transfer thereof to 3-D surfaces or bodies. The gelatin which may be used for the purpose of this invention may be that used, for example, for foods, which shows a chemical composition comprising 84–90% protein in a polypeptide chain of helical structure, 1–2% mineral salts, the rest being water.

It must be borne in mind that the protein high molecular weight makes its coherence is significant. In addition, gelatin shows a great elasticity and has the feature that in cold water it becomes soft and flexible, but is not dissolved. On the contrary, when applying heat, gelatin melts becoming adhesive, which makes it a simple and effective means to support images for transferring them to a surface or volume.

The use of gelatin for the purposes of this invention results very interesting because gelatin is harmless and biodegradable.

The use of gelatin to contain an image, i.e. as a printable means, taking profit of its characteristics, is very advantageous. Because of gelatin thixotropic capacity, it is possible to print an image on a gelatin sheet with any known means, for example, with printer, photocopier, serigraphy, etc. and to apply it thereafter on any surface or volume.

A gelatin practical application according to this invention may be figure decoration.

For this, first the image it is wished to transfer has to be printed on gelatin sheet. Printing gelatin sheet is achieved when gelatin is in solid state, i.e., when its water content is less than 10%. Thereafter, said sheet is moistened in order it becomes soft and flexible. Then, the sheet is applied on the body surface it is sought to decorate and on certain materials it is advisable to slightly heat thereafter gelatin sheet in order to achieve part melting gelatin which is in contact with the receiving surface and its definite adherence.

This shows a number of advantages, because, this way, it is possible to achieve, for example, mass figure decoration with subsequent cost being cut down.

Preferably, image transfer is carried out by moistening gelatin sheet and heating it at a temperature ranging from about 35 to 45° C. This is possible because gelatin has the capability to easily change its state depending on the temperature because of its low melting point. In temperatures lower than 35° C., gelatin newly gelifies.

According to an alternative embodiment of this invention, the surface on which gelatin sheets are applied is a previously die-cut laminar material. The image application is carried out in the way above disclosed, i.e., moistening gelatin sheet bearing the image. After applying the image to the die-cut material, each individual element of said die-cut material may be taken apart containing corresponding image portion.

As it has been said, gelatin gelifies under about 35° C. and, if no water is present, it remains substantially stiff. However, in order to provide the gelatin sheets used in this invention with a stronger stiffness said sheets may conveniently lay on a laminar support from which they may be taken apart by moistening them.

It is advisable that said laminar support is formed of a glazed material for taking in an easier way the gelatin apart when moistening it and that, in addition, it is permeable. An example of this type of support may be the so-called art paper which is very glazed and is mainly used in magazines and books which include pictures or photogravures. However, the very best solution is to use conventional permeable paper on which a film of material has being added which has the property to be dissolved in water, such as Arabic gum or dextrine, and which assists substantially to take the gelatin sheet apart in an easier way.

In fact, it must be understood that there exists two ways of applying the image printed on the gelatin sheet to a 3-D surface or body:

i) placing the gelatin sheet on a body, so that the image is not on the surface of contact of the gelatin sheet and the body. In this case, which is the most general, the gelatin sheet remains attached to the body thanks to above mentioned gelatin adhering characteristics;

ii) placing the sheet on a surface so that the image is on the contact face of the sheet and the surface when the sheet is applied. In this case, if the image ink (or paint) is impervious said surface contact face must be impregnated with an adhesive substance.

Although unmixed gelatin is colourless, certain applications according to this invention may require that the gelatin sheets are previously coloured with any conventional process. The colour may be opaque, for example, dissolving a pigment when the gelatin is in liquid state.

The use of gelatin as image support according to this invention shows the advantage that gelatin biodegradable character allows to replace the synthetic polymers currently used, such as polyethylene, polyester, triacetate, etc. which are aggressive for the environment. In addition, it must be borne in mind that it has been found that gelatin sheets exceptionally operates as image support in most of the conventional printing means, namely in ink-jet printers.

Other examples of applications which are included within the inventive concept of this invention are cardboard figure decoration (currently hand painted only), nail decoration (cosmetics), cake pieces decoration using edible inks, ceramic, glass, metal decoration, etc. Gelatin application for this last case disclosed replaces known vitrifiable decalcomanias, simplifying their production as no paper support is required nor to deposit the transferable material because, as it was explained above, the ink is directly printed on the gelatin sheet and thanks to its elasticity, applying the image to the body becomes easier.

Last, this invention also provides the use of gelatin as image support having a plurality of layers of gelatin sheet superimposed to achieve a more versatile behaviour combining several gelatin sheets having different physical properties (melting point, colouring, etc.).

Shapes and sizes of the gelatin sheets shall be independent from the use of this invention. Said shapes, sizes and even colours of the sheets disclosed in this invention may be replaced by other shapes, sizes and colours which are technically equivalent provided that they do not affect its spirit nor are out of the scope defined by the claims attached.

What is claimed is:

1. Use of a gelatin sheet, as single support for images and application of said sheet on a 3-D surface or body comprising:

printing on a surface of said sheet when said sheet has a water content lower than 10%, i.e., in a solid state;

moistening said printed sheet so that it becomes soft and flexible; and arranging said soft and flexible printed gelatine sheet against a 3D surface or body thanks to its elasticity, to which surface or body it remains attached.

2. Use, according to claim 1, characterized in that during the step of application of said gelatin sheet on a 3-D surface or body, it is submitted to a heat action.

3. Use, according to claim 2, characterized in that said heat action comprises to expose said gelatin sheet to temperatures ranging from about 35 to 45° C.

4. Use, according to claim 1, characterized in that said images printed on said gelatine sheet are not located on a contact surface of the gelatin sheet and said body.

5. Use, according to claim 1, characterized in that said images printed on said gelatine sheet are located on a contact surface of the gelatin sheet and said body.

6. Use, according to claim 5, characterized in that ink or pigments which define an image printed on said gelatine sheet are of impervious nature and in that said contact surface is impregnated with an adhesive substance.

7. Use, according to claim 1, characterized in that a pigment is dissolved in gelatin used to obtain said gelatine sheet, when said gelatin is in a liquid state.

8. Use, according to claim 7, characterized in that said pigment provides the gelatin sheet with a coloured nature.

9. Use, according to claim 1, characterized in that printing on the sheet is carried out with an ink-jet printer.

10. Use, according to claim 1, characterized in that inks used to print an image directly on said gelatin sheet are edible inks.

11. Use, according to claim 1, characterized in that said gelatine sheet comprises a plurality of layers of superimposed gelatin sheets, combining several gelatin sheets having different physical properties such as melting point, colour and others.

12. Use, according to claim 1, characterized in that a surface to which the image contained on said gelatin sheet is applied is a previously die-cut laminar material, so that each element of said die-cut material may be taken apart and each element contains a corresponding image portion.

13. Use, according to claim 9, characterized in that inks to print the image directly on said gelatin sheet are edible inks.

14. Use, according to claim 9, characterized in that the inks to print the image directly on the gelatin sheet are edible inks.

* * * * *

UNITED STATES PATENT AND TRADEMARK OFFICE
CERTIFICATE OF CORRECTION

PATENT NO. : 6,576,347 B1  Page 1 of 1
APPLICATION NO. : 09/646227
DATED : June 10, 2003
INVENTOR(S) : Julio Gomez Portella It is certified that error appears in the above-identified patent and that said Letters Patent is hereby corrected as shown below:

On the Title Page: Item (54) Title should read
--USE OF GELATIN IN SHEETS AS IMAGE SUPPORT AND METHOD FOR THE TRANSFER THEREOF TO 3-D SURFACES OR BODIES--

Signed and Sealed this

Twenty-seventh Day of February, 2007

JON W. DUDAS
*Director of the United States Patent and Trademark Office*